US012808440B2

(12) United States Patent
Di Sciullo et al.

(10) Patent No.: US 12,808,440 B2
(45) Date of Patent: Nov. 24, 2026

(54) PLUG VALVE

(71) Applicant: SOGEFI AIR & COOLING, Guyancourt (FR)

(72) Inventors: Bruno Di Sciullo, Ebersheim (FR); Nicolas Jacquet, Kaysersberg (FR); Vincent Balga, Bollwiller (FR)

(73) Assignee: SOGEFI AIR & COOLING, Guyancourt (FR)

( * ) Notice: Subject to any disclaimer, the term of this patent is extended or adjusted under 35 U.S.C. 154(b) by 0 days.

(21) Appl. No.: 18/703,035

(22) PCT Filed: Sep. 28, 2022

(86) PCT No.: PCT/EP2022/077043
§ 371 (c)(1),
(2) Date: Apr. 19, 2024

(87) PCT Pub. No.: WO2023/066631
PCT Pub. Date: Apr. 27, 2023

(65) Prior Publication Data

US 2024/0418272 A1 Dec. 19, 2024

(30) Foreign Application Priority Data

Oct. 20, 2021 (FR) ..................................... 21 11115

(51) Int. Cl.
*F16K 5/04* (2006.01)

(52) U.S. Cl.
CPC .......... *F16K 5/0471* (2013.01); *F16K 5/0407* (2013.01)

(58) Field of Classification Search
CPC .... F16K 5/0407; F16K 5/0471; F16K 27/065; F16K 11/0853; F16K 11/0856; F16K 11/085
See application file for complete search history.

(56) References Cited

U.S. PATENT DOCUMENTS 2,864,580 A * 12/1958 Lemoine ............... F16K 5/0471
251/317
3,346,002 A * 10/1967 Thompson, Jr. ...... F16K 5/0471
29/890.128
(Continued)

FOREIGN PATENT DOCUMENTS

| | | | | |
|---|---|---|---|---|
| CN | 106286900 | 1/2019 | | |
| DE | 3638518 A1 * | 5/1987 | ........... | F16K 27/065 |

(Continued)

OTHER PUBLICATIONS

Machine English translation of KR_20180044572_A (Year: 2025).*
(Continued)

*Primary Examiner* — Hailey K. Do
(74) *Attorney, Agent, or Firm* — IPSILON USA, LLP

(57) ABSTRACT

A plug valve includes a valve body with an inner volume and two communication orifices, a cylindrical plug having a circuit passing through between two orifices which are arranged to be positioned opposite orifices in the valve body, and an intermediate element having at least two through-orifices opposite respective communication orifices in the valve body. The inner surface of the intermediate element bearing at least one relief of which the top surrounds a through-orifice and forms a continuous contact surface bearing against the surface of the plug. A seal is positioned in compression at an orifice between the intermediate element and the valve body.

9 Claims, 4 Drawing Sheets

(56) References Cited

U.S. PATENT DOCUMENTS

| | | | | | |
|---|---|---|---|---|---|
| 4,395,018 | A * | 7/1983 | Moen | F16K 27/065 | |
| | | | | 251/900 | |
| 9,523,434 | B2 * | 12/2016 | Nagahama | F16K 5/0471 | |
| 10,883,619 | B2 * | 1/2021 | Smith | F16K 27/065 | |
| 2019/0346064 | A1 | 11/2019 | Nowell et al. | | |
| 2021/0033200 | A1 | 2/2021 | Seeger et al. | | |
| 2021/0180711 | A1 * | 6/2021 | Van Riel | F16K 5/0471 | |

FOREIGN PATENT DOCUMENTS

| | | | | |
|---|---|---|---|---|
| JP | 6317080 | | 4/2018 | |
| KR | 20180044572 | A * | 5/2018 | F16K 5/0407 |
| WO | WO-2021013340 | A1 * | 1/2021 | F16K 5/0471 |

OTHER PUBLICATIONS

Machine English translation of WO_2021013340_A1 (Year: 2025).*
Machine English translation of DE-3638518-A1 (Year: 2026).*
International Search Report dated Dec. 15, 2022.

* cited by examiner

PLUG VALVE

RELATED APPLICATION

This application is a National Phase of PCT/EP2022/077043 filed on Sep. 28, 2022, which claims the benefit of priority from French Patent Application No. 21 11115 filed on Oct. 20, 2021, the entirety of which are incorporated by reference.

FIELD OF THE INVENTION

The present invention relates to the field of plug valve mechanisms and more specifically to sealing mechanisms for plug valves.

DESCRIPTION OF RELATED ART

Plug valves are based on a substantially cylindrical structural construction positioned through an inlet orifice and an outlet orifice. This construction uses a cylindrical part of circular section traversed by a conduit for the circulation of a fluid, this cylindrical part being inserted into a seat of substantially matching shape, in which the cylindrical part is mounted axially pivotingly. The pivoting is then arranged to align the conduit passing through the cylindrical part with the inlet and outlet orifices of the valve.

The valves are intended to enable or prevent circulation of a fluid through a circuit. Moreover, to optimize operation of a valve by efficiently managing the circulation of the fluid flowing therethrough, operation of this valve must be perfectly fluid tight to completely prevent flow in the closed position and to prevent any loss of flow in the open position. In plug valves, the cylindrical shape and the curved surface of the plug represent an additional constraint when managing fluid tightness between the surface of the plug and each of the inlet and outlet orifices of the valve. This is because it is difficult for the surfaces of the plug and the orifices to match perfectly, notably on account of the play that is likely to exist between the surfaces of the internal parts of the valve.

To address this problem, one solution involves positioning a ring gasket, for example an O-ring, on each of the internal openings of the orifices of the valve, so that these gaskets are positioned in compression between the surface of the plug and the peripheral surface of an internal opening of an orifice. However, the limitations of such a solution are quickly evident. This is because the friction caused by the curved surface of the plug moving against the gasket causes the gasket to wear or to be deformed at the joining surface with the plug, so that the fluid tightness of the gasket is liable to lose quality.

OBJECTS AND SUMMARY

The present invention is intended to overcome these drawbacks by proposing a plug valve that is able to maintain an efficient seal when in operation over time, while having a design that is easy to implement.

The invention therefore relates to a plug valve characterized in that the valve comprises at least:

- a valve body comprising an internal volume associated with at least two communication orifices in communication with respective conduits,
- a cylindrical plug of circular section, the plug comprising at least one circuit passing between at least two orifices in the peripheral surface of the plug, at least two orifices of the plug being arranged on the peripheral surface to enable said orifices to be positioned simultaneously opposite respective communication orifices of the valve body,
- an intermediate element comprising at least two through-orifices between two opposing surfaces, specifically an inner surface and an outer surface, the through-orifices being arranged opposite respective communication orifices of the valve body, the outer surface of the intermediate element being designed to be positioned opposite the internal volume of the valve body, the inner surface bearing at least one relief surrounding a through-orifice being designed so that the top of the relief forms about the orifice at least one continuous contact surface bearing against the peripheral surface of the plug,
- a gasket positioned in compression on an orifice between the intermediate element and the valve body.

BRIEF DESCRIPTION OF THE DRAWINGS

The invention can be better understood from the description of different preferred embodiments provided below as non-limiting examples and explained with reference to the attached schematic drawings, in which.

DETAILED DESCRIPTION

Figure 1:
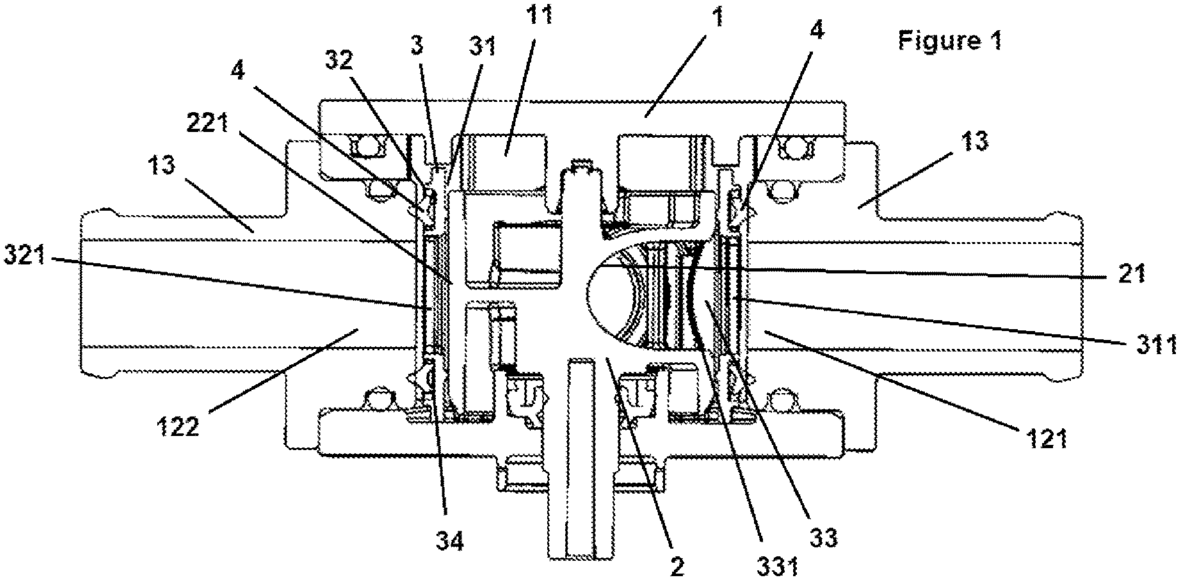
FIG. 1 is a schematic cross section view of an example plug valve according to the invention.
Figure 2:
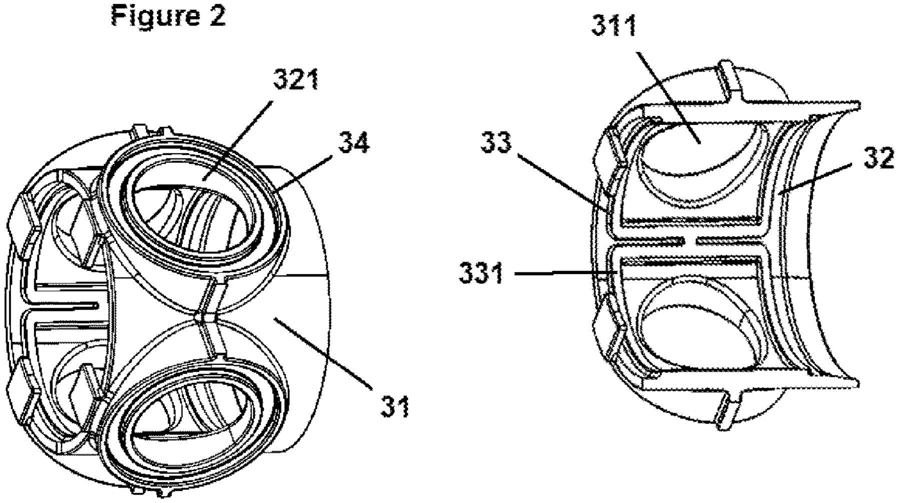
FIG. 2 is a schematic view of a first example intermediate element for a plug valve according to the invention.
Figure 3:
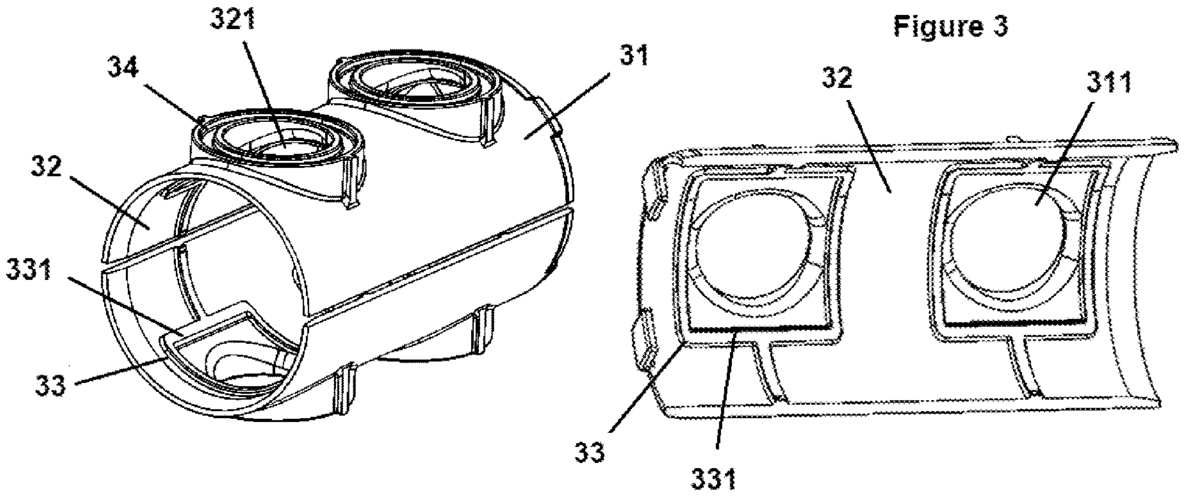
FIG. 3 is a schematic view of a second example intermediate element for a plug valve according to the invention.
Figure 4:
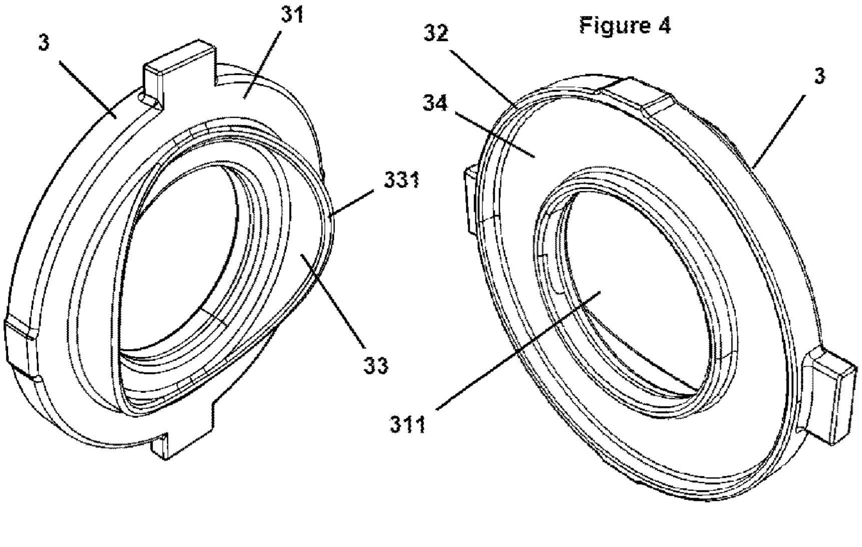
FIG. 4 is a schematic view of a third example intermediate element for a plug valve according to the invention.
Figure 5:
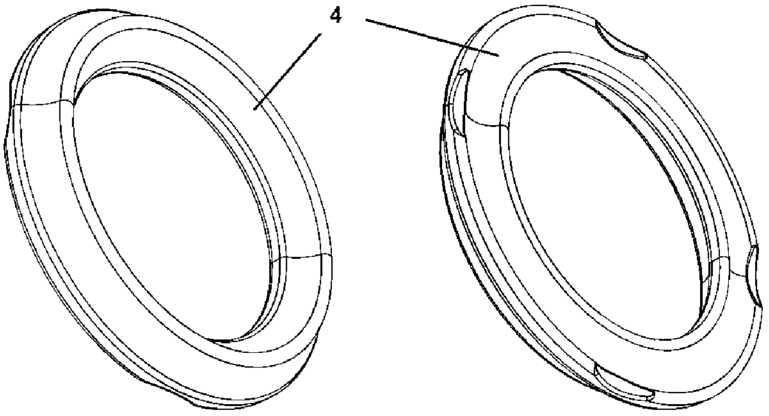
FIG. 5 is a schematic view of an example gasket for a plug valve according to the invention.
Figure 6:
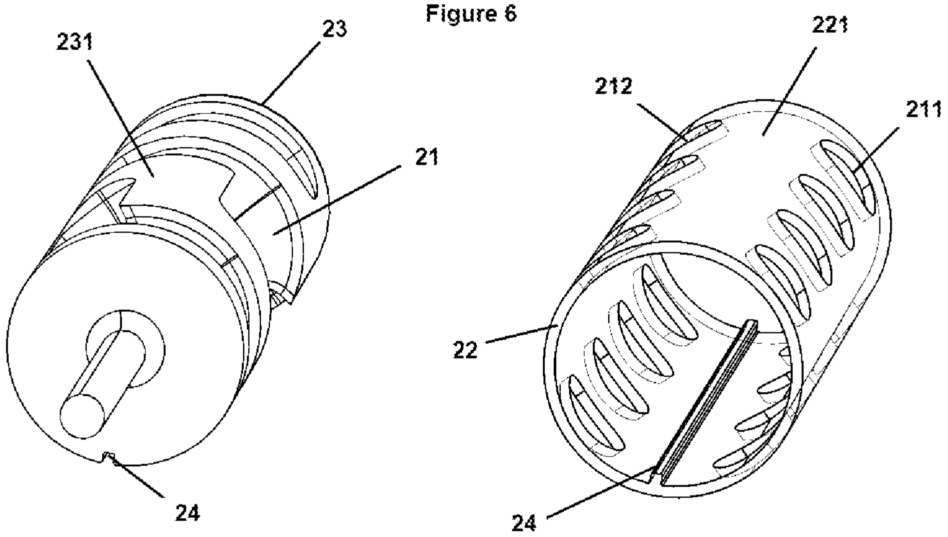
FIG. 6 is a schematic view of different parts of an example cylindrical plug for a plug valve according to the invention.
Figure 7:
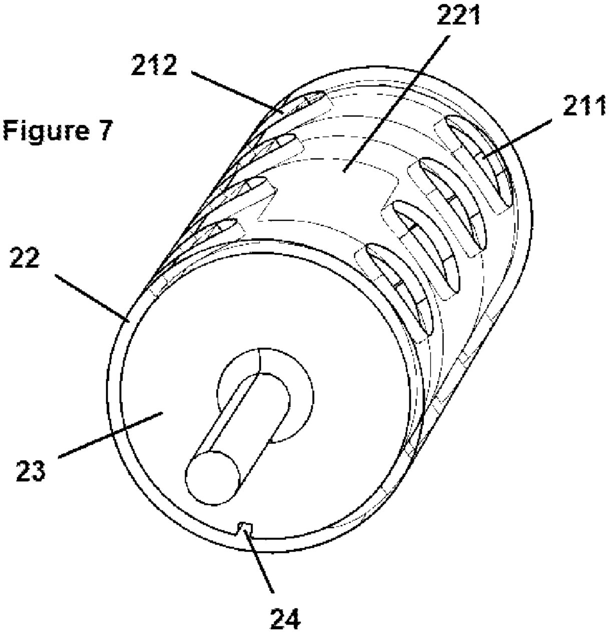
FIG. 7 is a schematic view of an example cylindrical plug for a plug valve according to the invention.

The invention relates to a plug valve characterized in that the valve comprises at least:

- a valve body 1 comprising an internal volume 11 associated with at least two communication orifices 121, 122 in communication with respective conduits 13,
- a cylindrical plug 2 of circular section, the plug 2 comprising at least one circuit 21 passing between at least two orifices 211, 212 in the peripheral surface 221 of the plug 2, at least two orifices 211, 212 of the plug 2 being arranged on the peripheral surface 221 to enable said orifices to be positioned simultaneously opposite respective communication orifices 121, 122 of the valve body 1,
- an intermediate element 3 comprising at least two through-orifices 311, 321 between two opposing surfaces, specifically an inner surface 32 and an outer surface 31, the through-orifices 311, 321 being arranged opposite respective communication orifices 121, 122 of the valve body 1, the outer surface 31 of the intermediate element 3 being designed to be positioned opposite the internal volume 11 of the valve body 1, the inner surface 32 bearing at least one relief 33 surrounding a through-orifice 321 being designed so that the top of the relief 33 forms about the orifice 321 at least one continuous contact surface 331 bearing against the peripheral surface 221 of the plug 2, a gasket 4 positioned in compression on an orifice between the intermediate element 3 and the valve body 1.

The plug valve according to the invention forms a fluid tight joint between the plug 2 and the valve body 1 that is based, on one hand, on a friction joint between the contact surface 331 of the intermediate element 3 and the peripheral surface 221 of the plug 2 and, on the other hand, on an elastic joint formed by the gasket 4 between the intermediate element 3 and the valve body 1. The plug valve according to the invention is thus able to exploit the elastic properties of the gasket 4 without said gasket being in direct contact with the friction against the peripheral surface 221 of the plug 2. The friction joint between a contact surface 331 of the intermediate element 3 and the peripheral surface 221 of the plug 2 therefore involves contact between two rigid surfaces, thereby obviating the risk of deformation during operation of the plug valve according to the invention. The seal between an orifice 121, 122 of the plug 2 and one of the communication orifices 121, 122 of the valve body 1 is thus made, on one hand, by the gasket 4 that creates a ring about the alignment of the respective through-orifices between the outer face 31 of the intermediate element 3 and the valve body 1 and, on the other hand, by the continuity of the contact surface 331 bearing against the peripheral surface 221 of the plug 2. A contact surface 331 of the intermediate element 3 is thus arranged to form a ring about one of the orifices 211, 212 in the peripheral surface 221 of the plug 2, to seal the assembly formed by the internal volumes of the orifice 311, 321 of the intermediate element 3 and of the orifice 211, 212 of the plug 2 in relation to other volumes and spaces liable to exist between the intermediate element 3 and the plug 2.

Within the scope of the valve according to the invention, the intermediate element 3 is mounted inside the valve body 1 and constrained to rotate therewith, so that the intermediate element 3 is static in relation to the plug 2, which can pivot axially inside the valve body 1. Furthermore, once in position inside the valve body 12, this intermediate element 3 is also constrained to translate with the valve body 1. By way of preferred example, such constraining of the intermediate element 3 in the valve body 1 involves three-dimensional shapes on the outer surface 31 that substantially match the three-dimensional shapes of the inner surface of the valve body 12 located at least one of the orifices 121, 122. Constraining the intermediate element 3 in position inside the valve body 1 also involves a force exerted by the plug 2 against the inner surface 32 of the intermediate element 3. The intermediate element 3 is therefore constrained by compression of this intermediate element 3 between, on one hand, the gasket 4 that forms a deformable elastic joint with the inside of the valve body 1 and, on the other hand, the plug 2. The gasket 4 creates an elastic structure in the thickness of this compression to eliminate any play that could exist between the different parts of the valve and notably in the pinching of the intermediate element 3 by the plug 2 and the valve body 1.

It should be noted that, in the context of the valve according to the invention, the valve body 1 is made of at least two parts that are assembled together to form a clamshell inside which the different elements of the valve are seated. According to a first example construction, the two parts of the valve body 1 are two substantially similar halves of the valve body 1. Each of these halves of the valve body 1 comprises one or more seats specifically designed to receive one or more of the different elements positioned inside the valve. These different seats built into each of the halves of the valve body 1 are also arranged to cooperate with one another to define the different internal volumes when the two halves of the valve body 1 are joined together. According to a second example construction, the two parts of the valve body 1 are made such that a first part forms a seat inside which each of the different elements of the valve, if not the majority of these elements, are inserted. The second part then forms a partition structure of the seat formed by the first part to constrain the different constituent elements of the valve therein.

According to an example corresponding to a construction variant of the invention, the valve comprises an intermediate element 3 structurally made of one or more parts cooperating with one another and designed to form an arrangement that surrounds the cylindrical peripheral surface 221 of the plug 2. According to this construction variant, these parts of the intermediate element 3 cooperate with one another to create an arrangement defining a volume inside which the plug 2 is positioned and held axially in position. The intermediate element 3 has, on the inner surface 32 thereof, one or more contact surfaces 331 that are designed to bear fully against the peripheral surface 221 of the plug 2. Moreover, these different contact surfaces 331 of the intermediate element 3 form support interfaces that participate in the axial positioning of the plug 2 inside the valve body 1. This volume defined by the contact surfaces 331 and inside which the plug 2 is positioned has a cylindrical shape of substantially circular section. Such a cylindrical arrangement of substantially circular section of the inner surfaces 32 of the intermediate elements 3 is also arranged coaxially with the pivot axis of the plug 2 so as not to interfere, on one hand, with the rotation of the plug 2 in relation to the inner surface 32 of the intermediate elements 3 that define the seat this plug 2, and, on the other hand, with the positioning of the orifices 211, 212 of this plug 2 opposite through-orifices 311, 321 in the intermediate elements 3.

According to an example corresponding to a specific construction variant of the variant detailed above, the valve comprises an intermediate element 3 made of two parts arranged so that each of the parts of the intermediate element 3 covers a respective half of the cylindrical peripheral surface 221 of the plug 2. According to this construction variant, each of the two parts of the intermediate element 3 is structurally designed to interact with the plug 2 over one half of the radial circumference of the plug 2. Thus, the contact surfaces 331 of a given part of the intermediate element 3 interact with a given half of the surface 221 of the plug 2 in relation to a plane passing through the pivot axis of the plug 2. The two parts of the intermediate element 3 thus form two halves of a clamshell that, in section in a plane perpendicular to the axis of the plug, surround this plug 2 by being positioned on both sides thereof. Depending on the arrangement of the through-orifices 311, 321 on the intermediate element 3, the distribution of the through-orifices 311, 321 between each of the parts of the intermediate element 3 means that the parts of the intermediate element 3 are able to have just one, several or potentially no through-orifices 311, 321.

According to an example corresponding to a construction variant that can be combined with the different variants detailed above, the top of the relief 33 of the inner surface 32 of at least a part of the intermediate element 3 defines a contact surface 331 corresponding to at least all of the points of the virtual intersection between, on one hand, a cylinder parallel to the axis of the through-orifice 311, 321 surrounded by the relief 33 and, on the other hand, a circular cylinder of which the axis coincides with the axis of the plug 2 and of which the radius is less than or equal to the radius of the plug 2. According to this construction variant, at the contact between the peripheral surface 221 of the plug 2 and a contact surface 331 of the intermediate element 3, the structures of the surfaces 221, 331 that interact with one another are arranged so that the contact there between is maintained over time in the form of a substantially annular continuous surface that surrounds the through-orifice 311, 321 of the intermediate element 3 and an orifice 211, 212 of the plug 2. The provision of a contact surface 331 that corresponds to the intersection between a cylinder along the axis of the through-orifice 311, 321 of the intermediate element 3 and a circular cylinder of which the axis and the radius are identical to the axis and the radius of the plug 2 enables a perfect match between the shapes of the plug 2 and the intermediate element 3 so that these two elements are easy to position against one another inside the valve body 1 at the friction surfaces thereof. However, preferably, the contact surface 331 corresponds to the intersection between a cylinder along the axis of the through-orifice 311, 321 of the intermediate element 3 and a circular cylinder of which the axis is identical to the axis of the plug 2, but of which the radius is slightly less than the radius of the plug 2. This difference in radius therefore corresponds to the positioning of a concave surface of lesser radius against a convex surface of greater radius. Bringing these two surfaces into contact notably involves a deformation of the contact surface 331 of the relief 33 of the intermediate element 3, which is compressed against the peripheral surface 221 of the plug 2. Furthermore, these surfaces bearing against one another cause the intermediate element 3 and the plug 2 to push against one another. Thus, inside the confined volume of the valve body 1, the positioning of the plug 2 against the inner surface 32 of the intermediate element 3 involves the transmission of a compressive force from the intermediate element 3 against the gasket 4 and the valve body 1. This compressive force is therefore amplified by the separating force of the intermediate element 3 in relation to the plug 2 as a result of the radius difference between the contact surface 331 of the intermediate element 3 and the peripheral surface 221 of the plug 2.

According to an example corresponding to a construction variant that can be combined with the different variants detailed above, the section profile of the outer surface 31 of at least one intermediate element 3 matches the section profile of the internal volume of the valve body 1, enabling the intermediate element 3 to be positioned by translation in the valve body 1. A valve comprising the different technical details of this construction variant and notably when this matching section profile is arranged along a length of the internal volume of the valve body 1, the intermediate element 3 can be inserted by translational movement of the section profile of the intermediate element 3 against the matching section profile of at least one inner surface of the valve body 1 along a length of the valve body 1. According to an example of insertion of the intermediate element 3 into the valve body 1, the intermediate element 3 is associated with the plug 2 before the assembly formed by the plug 1 and the intermediate element 3 is inserted by translation to the position thereof inside the valve body 1. Similarly, according to an additional example, the intermediate element 3 is inserted into the valve body 1 by being associated, on one hand, with the plug 2 and, on the other hand, with at least one gasket 4. Thus, during this insertion, the intermediate element 3 is positioned directly in compression between the gasket and the plug 2 inside the valve body 1.

According to an example corresponding to a construction variant that can be combined with the different variants detailed above, the intermediate element 3 comprises at least one part structurally designed to comprise a main body having a shape similar to a cylindrical tube portion and a concavity matching a peripheral portion of a cylinder of circular section, so that the relief 33 on the inner surface 32 has a continuous thickness on the inner surface 32 of the intermediate element 3. According to this variant embodiment, the intermediate element 3 has an arrangement in which the inner surface 32 forms a concave construction that substantially fits the convexity of the peripheral surface 221 of the plug 2 over at least a part of the plug 2. Where the intermediate element 3 is made of several parts, these different parts are arranged about the plug 2 to surround the plug in at least one section plane of the plug 2. The cylindrical arrangement of the intermediate element 3 enables this intermediate element 3 to be positioned in the valve body 1 by insertion along the axis of the cylinder. This positioning can also be carried out jointly with the positioning of the plug 2 where the axes of the cylinders of these two parts are substantially parallel with one another. The contact surface 331 of the dedicated relief 33 of the intermediate element 3 has an annular arrangement about at least one of the through-orifices 311, 321 of the intermediate element 3. According to an example embodiment, this relief 33 takes the form of one or more thickening lines of the inner surface 32. The thickness of this relief 33 is defined to be sufficient to maintain a gap between the inner surface 32 of the intermediate element 3 and the peripheral surface 221 of the plug 2, so that only the contact surface 331 of the relief 33 rubs against the surface of the plug 2. The relief 33 thus prevents the whole of the concave inner surface 32 from rubbing against the plug 2, thereby exerting too much force to allow the plug 2 to rotate about its own axis.

According to an example corresponding to a construction variant that can be combined with the different variants detailed above, the intermediate element 3 comprises at least one part structurally designed to comprise a substantially flat main body of which the inner surface 32 comprises a portion of a cylinder oriented along an axis perpendicular to the plane of the main body and of which the end forms a continuous contact surface 331 having a concavity intended to bear against the peripheral surface 221 of the plug 2. This part of the intermediate element 3 is thus arranged to be positioned opposite a communication orifice 121, 122 of the valve body 1 in a plane substantially parallel to the plane of the communication orifice 121, 122 inside the valve body 1. According to an example embodiment, the substantially flat body of the intermediate element is arranged to be positioned in a seat that comprises at least one slot on the inner face of the valve body 1. The insertion of the main body of a part of the intermediate element 3 into a slot of the valve body 1 facilitates the positioning thereof during assembly of the different elements of the valve according to the invention. The inner surface 32 of the part of the intermediate element 3 also comprises a relief 33 formed by a cylinder portion that surrounds a through-orifice 311, 321 positioned on the part of the intermediate element 3 and of which the axis of the through-orifice 311, 321 is perpendicular to the plane of the main body of this part of the intermediate element 3. It should be noted that, where the intermediate element 3 is made of several parts, each of these parts can be positioned at a respective communication orifice 121, 122 of the valve body 1 by cooperation with a respective seat in the inner face of the valve body 1. The concavities formed by the contact surfaces 311 of the inner faces of each of the parts of the intermediate element 3 are arranged to cooperate such as to define the volume in which the plug 2 is positioned to pivot axially.

According to an example corresponding to a construction variant that can be combined with the different variants detailed above, the outer surface 31 of the intermediate element 3 comprises at least one seat 34 designed to position at least a part of a gasket 4. According to this construction example, the gasket 4 is associated with the intermediate element 3 in a seat 34 that has an annular shape arranged about a through-orifice 311, 321 of the intermediate element 3. According to a construction example, this seat 34 is made in the form of a slot of width substantially identical to the width of the gasket 4. According to an alternative example, the width of the seat 34 is slightly less than the width of the gasket 4 so that the gasket 4 is positioned in compression inside the seat 34 along an axis perpendicular to the slot of the seat 34. This compression of the gasket 4 in the seat 34 provides prestressing that enables the gasket 4 to be stiffened before compression thereof during assembly of the different component elements of the valve according to the invention.

According to an example corresponding to a construction variant that can be combined with the different variants detailed above, the cylindrical plug 2 comprises, on one hand, a deep structure 23 of which the peripheral surface 231 has at least one slot forming a displacement circuit 21 and, on the other hand, a surface structure 22 of which the peripheral surface forms the peripheral surface 221 of the plug 2 and covers the peripheral surface 231 of the deep structure 23; the surface structure 22 comprising at least two orifices 211, 212 through the surface structure 22 that are designed to be positioned simultaneously opposite respective communication orifices 121, 122 of the valve body 1. According to this construction example, the deep structure 23 of the plug 2 incorporates one or more slots arranged on the surface 231 of this deep structure 23, or combined with conduits through this deep structure 23. These slots and these conduits define one or more circuits 21 that are connected or independent of one another for the circulation of a fluid through the plug 2. The surface structure 22 of the plug 2 forms a covering structure of the deep structure of 23 of the plug 3 such that the different slots in the surface 231 of the deep structure 23 are partitioned and form conduits of which the inner surface is thus formed by the combination of the deep structure 23 and the surface structure 22. The surface structure 22 comprises several orifices 211, 212 that pass through the thickness of the surface structure 22 between, on one hand, the peripheral surface 221 of the plug 22 and, on the other hand, the internal volume of a slot or of a conduit of the deep structure 23. It should be noted that the surface structure 22 may comprise several groups of through-orifices 211, 212, such that these groups are configured so that, alternately, the through-orifices 211, 212 of these groups are simultaneously positioned opposite respective communication orifices 121, 122 of the valve body 1. This layout enables different communication orifices 121, 122 of the valve body 1 to be connected through the plug 2 as a function of different pivot positions of the plug 2. Furthermore, according to another construction example, the through-orifices 211, 212 of a given group are arranged to cooperate with a specific displacement circuit 21 of the plug 2. Thus, different groups of through-orifices 211, 212 are associated with respective displacement circuits 21 of the plug 2 so that the axial pivoting of the plug 2 enables different communication orifices 121, 122 of the valve body 1 to be connected by means of through-orifices 211, 212 to the different displacement circuits 21 of the plug 2. It should also be noted that the surface of the surface structure 22 in contact with the deep structure 23 matches the peripheral surface 231 of the deep structure 23 to form a fluid tight joint between these two structures 22, 23 of the plug 2. Similarly, the surface structure 22 is arranged about the deep structure 23, at least at the slotted portion of the deep structure 23, so that these two structural parts of the plug 2 are concentric about the axial pivot axis of the plug 2.

According to an example corresponding to a construction variant that can be combined with the variant detailed above, the surface structure 22 and the deep structure 23 of the plug 2 cooperate via means 24 for guiding the translation and constraining the rotation of the surface structure 22 in relation to the deep structure 23. According to this example embodiment, the join between the deep structure 23 and the surface structure 22 of the plug 2 comprises a slot in a first of the two structures 22, 23 and arranged to cooperate with a projecting guide element on the second of the two structures 22, 23 of the plug 2. By way of example, this slot is arranged along an axis substantially parallel to the axis of the plug 2 so that these two structures, specifically the deep structure 23 and the surface structure 22, are assembled by axial insertion of the deep structure 23 into the surface structure 22 by sliding the projecting guide element into the corresponding slot. By way of alternative example, the slot is arranged in a spiral similar to a screw thread. The two structures, specifically the deep structure 23 and the surface structure 22, are then assembled by screwing the surface structure 22 about the deep structure 23. Once assembled by screwing, the two structures, specifically the deep structure 23 and the surface structure 22, are joined in the form of an assembly constrained in translation and axial rotation, notably when the plug 2 is positioned inside the valve body 1.

According to an example corresponding to a construction variant that can be combined with one of the two variants detailed above, at least one intermediate element 3 and the peripheral surface 221 of the plug 1 are made of the same or different plastic materials. Indeed, within the scope of the valve according to the invention, the friction joint between a contact surface 331 of the intermediate element 3 and the peripheral surface 221 of the plug 2 therefore involves contact between two rigid surfaces, thereby obviating the risk of deformation during operation of the plug valve according to the invention. Furthermore, the plastic materials that may be used within the scope of the embodiment of the intermediate element 3 and/or the peripheral surface 221 of the plug 1 are thermoplastics such as polyamide or polyphenylene sulfide (PPS), or EPDM or HNBR optionally combined with a PTFE coating to optimize sliding of the rigid plastic surfaces in contact with one another. PTFE-reinforced thermosetting and thermoplastic materials are also preferred. In general, the materials used must be compatible with the fluids (gas or liquid) conveyed through the valve according to the invention to ensure that there is no reaction there between.

Naturally, the invention is not limited to the embodiments described and/or illustrated in the attached drawings. Modifications may be made to the invention, notably in terms of the constitution of the different elements or by substitution for technical equivalents, without thereby departing from the scope of protection of the invention.

The invention claimed is:

1. A plug valve comprising:

a valve body comprising an internal volume associated with at least two communication orifices in communication with respective conduits, a cylindrical plug of circular section, the cylindrical plug comprising at least one circuit passing between at least two orifices in a peripheral surface of the cylindrical plug, said at least two orifices of the cylindrical plug being arranged on the peripheral surface to enable said at least two orifices to be positioned simultaneously opposite respective communication orifices of the valve body, an intermediate element comprising at least two through-orifices between an inner surface and an outer surface, the at least two through-orifices being arranged opposite respective communication orifices of the valve body, the outer surface of the intermediate element being designed to be positioned opposite the internal volume of the valve body, the inner surface bearing at least one relief surrounding a through-orifice being designed so that a top of the at least one relief forms about the through-orifice at least one continuous contact surface bearing against the peripheral surface of the cylindrical plug, a gasket positioned in compression on an orifice between the intermediate element and the valve body, and the top of the at least one relief defines a contact surface corresponding to at least all points of a virtual intersection between a cylinder parallel to an axis of the through-orifice surrounded by the at least one relief and a circular cylinder of which an axis of said circular cylinder coincides with an axis of the cylindrical plug and a radius of the circular cylinder is less than or equal to a radius of the cylindrical plug, wherein the cylindrical plug comprises a deep structure of which a peripheral surface thereof has at least one slot forming a displacement circuit and a surface structure of which a peripheral surface thereof forms the peripheral surface of the cylindrical plug and covers the peripheral surface of the deep structure; the surface structure comprising at least two orifices through the surface structure that are designed to be positioned simultaneously opposite respective communication orifices of the valve body.

2. The plug valve as claimed in claim 1, wherein a section profile of the outer surface of the intermediate element matches a section profile of the internal volume of the valve body, enabling the intermediate element to be positioned by translation in the valve body.

3. The plug valve as claimed in claim 1, wherein the intermediate element comprises at least one part structurally designed to comprise a main body having a shape defined as a cylindrical tube portion and a concavity matching a peripheral portion of a cylinder of circular section, so that the at least one relief on the inner surface has a continuous thickness on the inner surface of the intermediate element.

4. The plug valve as claimed in claim 1, wherein the intermediate element comprises at least one part structurally designed to comprise a substantially flat main body of which the inner surface comprises a portion of a cylinder oriented along an axis perpendicular to a plane of the main body and of which an end forms the at least one continuous contact surface having a concavity intended to bear against the peripheral surface of the cylindrical plug.

5. The plug valve as claimed in claim 1, wherein the outer surface of the intermediate element comprises at least one seat designed to position at least a part of the gasket.

6. The plug valve as claimed in claim 1, wherein the surface structure and the deep structure of the cylindrical plug cooperate via means for guiding the translation and constraining the rotation of the surface structure in relation to the deep structure.

7. The plug valve as claimed in claim 1, wherein at least one intermediate element and the peripheral surface of the cylindrical plug are made of a same or different plastic materials.

8. The plug valve as claimed in claim 1, wherein the intermediate element is structurally made of one or more parts cooperating with one another and designed to form an arrangement that surrounds a cylindrical peripheral surface of the cylindrical plug.

9. The plug valve as claimed in claim 8, wherein the intermediate element is made of two parts arranged so that each of the two parts of the intermediate element covers a respective half of the cylindrical peripheral surface of the cylindrical plug.

* * * * *